UNITED STATES PATENT OFFICE.

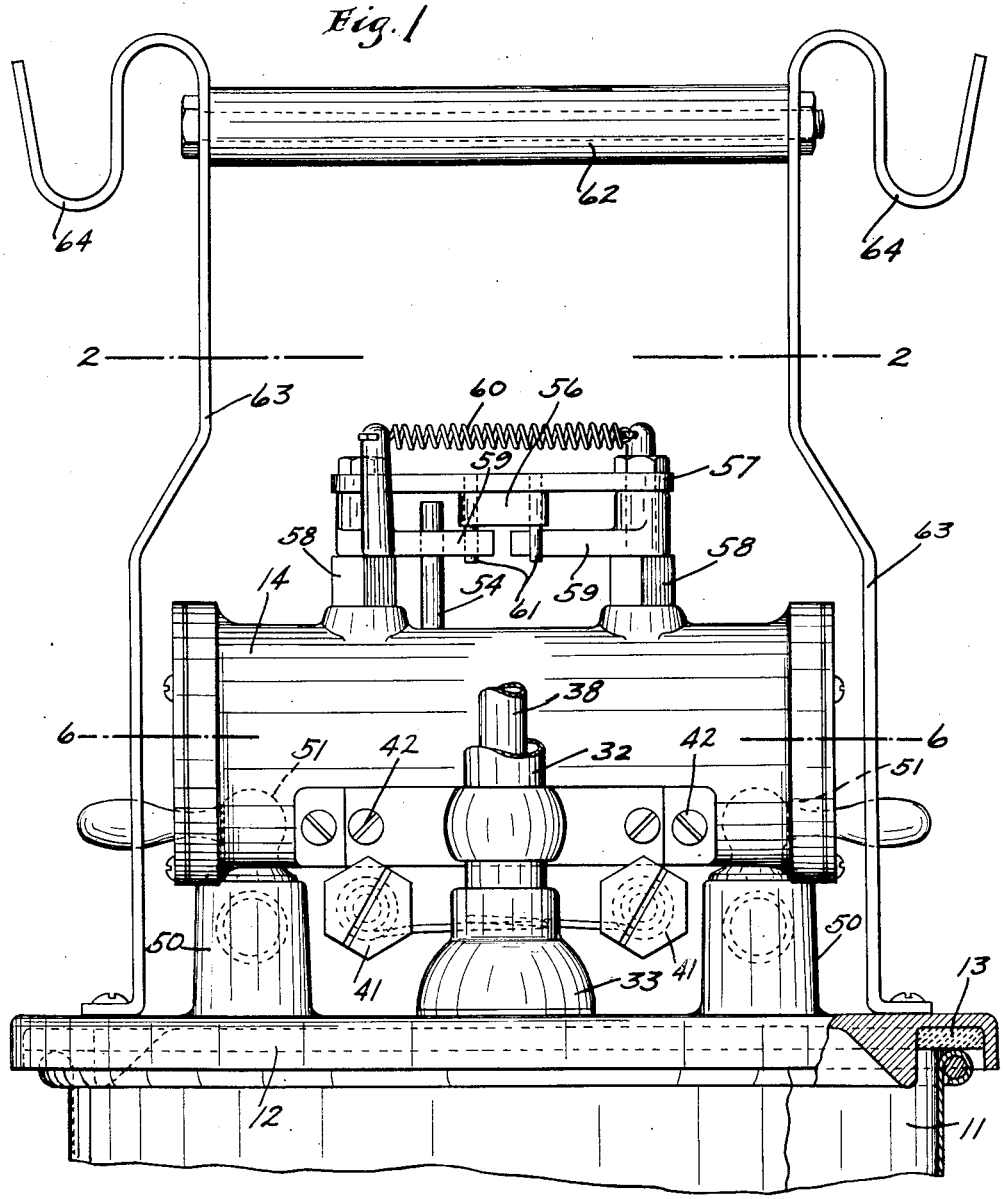

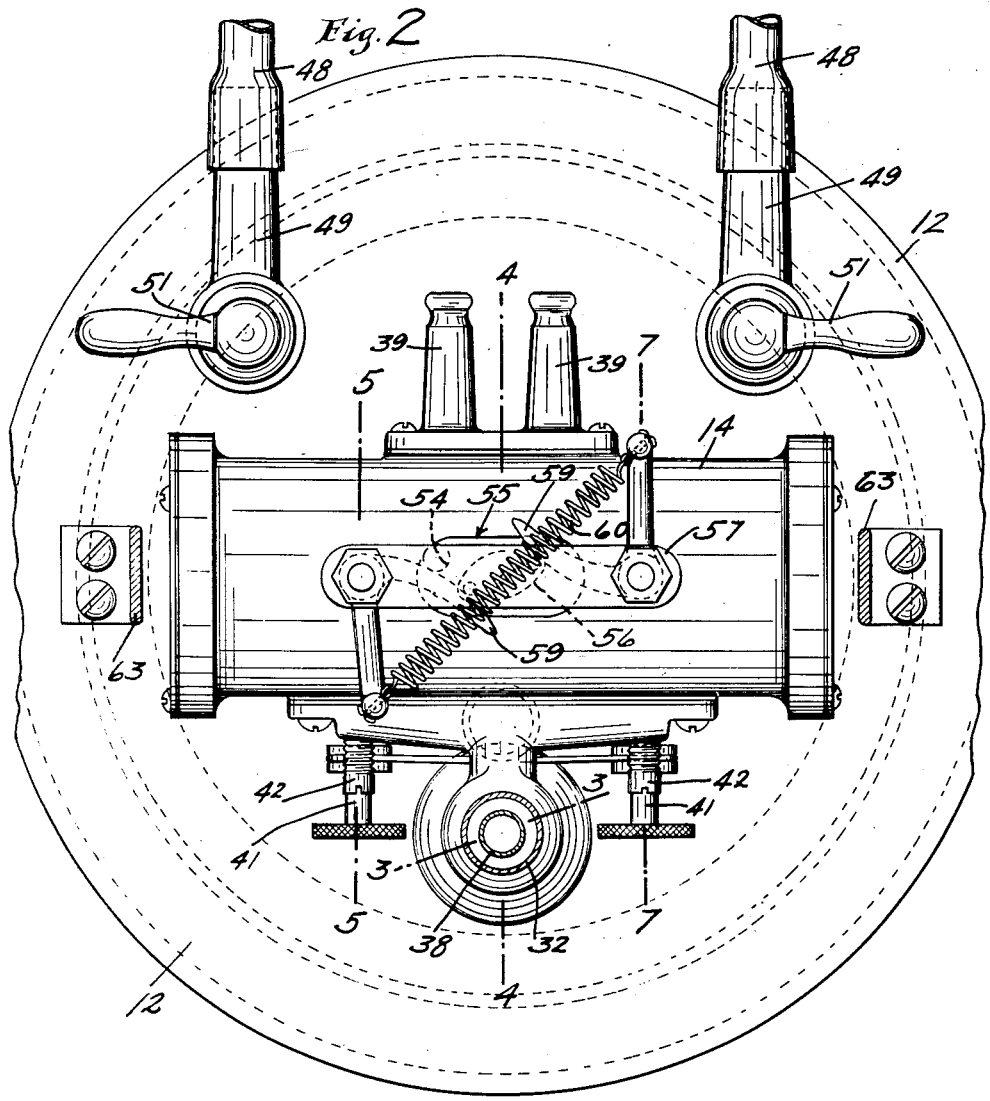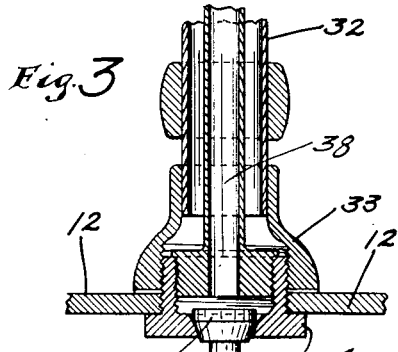

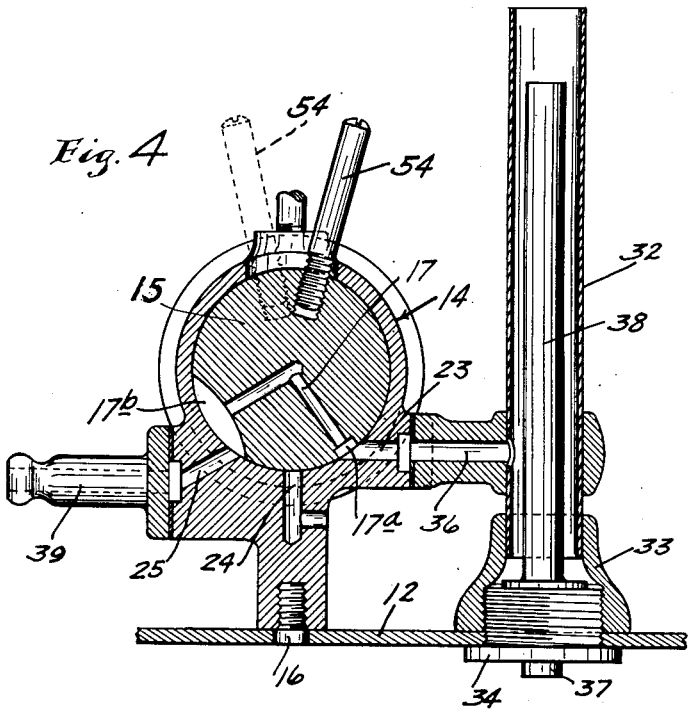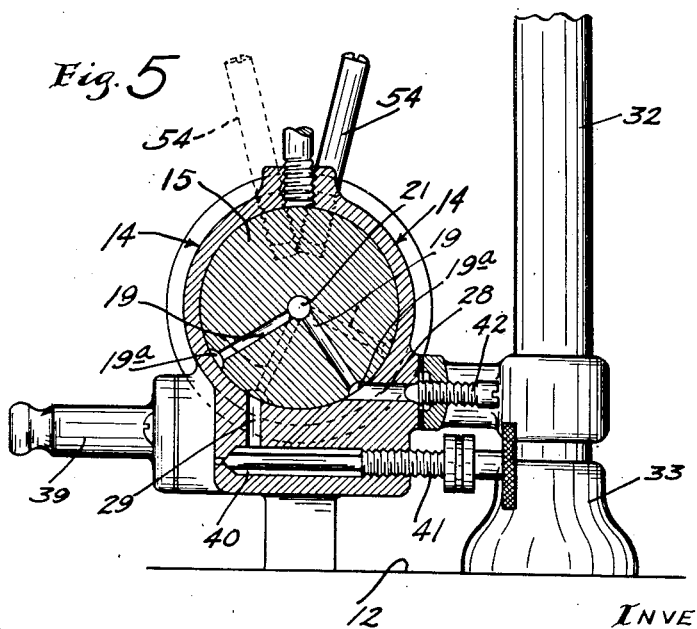

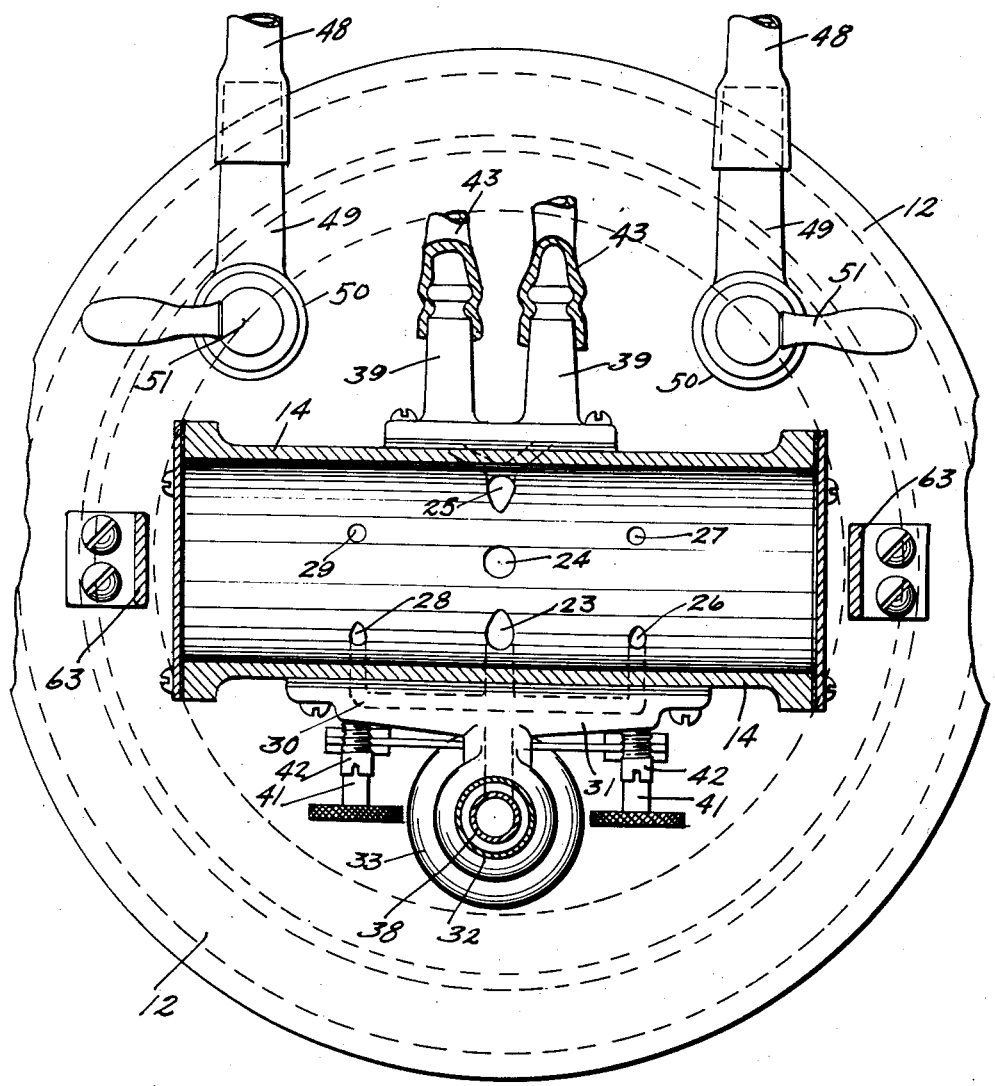

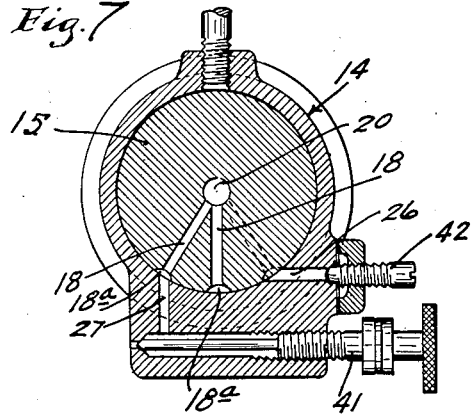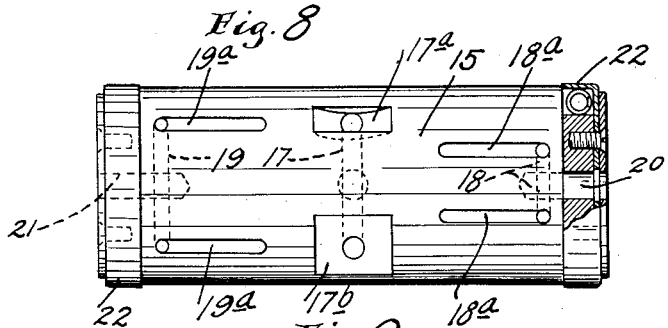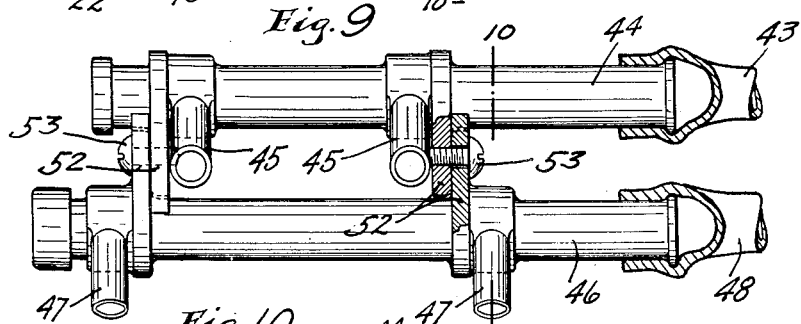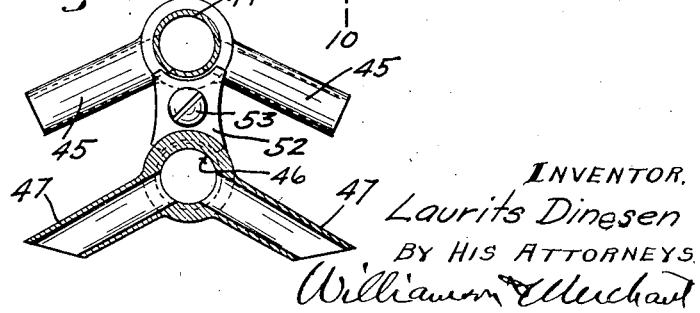

LAURITS DINESEN, OF MINNEAPOLIS, MINNESOTA, ASSIGNOR TO PERFECTION MANUFACTURING COMPANY, OF MINNEAPOLIS, MINNESOTA, A CORPORATION OF MINNESOTA.

MILKING APPARATUS.

1,371,355.  Specification of Letters Patent.  Patented Mar. 15, 1921.

Application filed April 22, 1918. Serial No. 229,981.

*To all whom it may concern:*

Be it known that I, LAURITS DINESEN, a citizen of the United States, residing at Minneapolis, in the county of Hennepin and State of Minnesota, have invented certain new and useful Improvements in Milking Apparatus; and I do hereby declare the following to be a full, clear, and exact description of the invention, such as will enable others skilled in the art to which it appertains to make and use the same.

My present invention relates to milking apparatus and is in the nature of a modification of, or improvement on the mechanism disclosed and claimed in my prior Patent No. 1,117,169, entitled, "Pulsating device for milking apparatus," and issued of date, November 17, 1914.

Particularly the present invention is directed to features of improvement whereby the relative time movements of the piston in both directions may be varied, at will, to thereby regulate the apparatus for milking different cows, but further is directed to certain other features which will hereinafter appear and be defined in the claims.

Generally stated, the invention consists of the novel devices and combinations of devices hereinafter described and defined in the claims.

In the accompanying drawings, which illustrate the invention, like characters indicate like parts throughout the several views.

Referring to the drawings:

Figure 1 is a side elevation showing chiefly what is herein designated as the pulsating device of the milking apparatus, and showing the same applied to a milk can, some parts being sectioned and some parts being broken away;

Fig. 2 is a horizontal section taken on the line 2—2 of Fig. 1;

Fig. 3 is a detail in section on the line 3—3 of Fig. 2;

Fig. 4 is a transverse section taken on the line 4—4 of Fig. 2, some parts being removed from the top of the pulsator cylinder;

Fig. 5 is a transverse section taken approximately on the line 5—5 of Fig. 2;

Fig. 6 is a horizontal section taken on the line 6—6 of Fig. 1, the piston of the pulsator being removed;

Fig. 7 is a section taken on the line 7—7 of Fig. 2, but with some parts beyond the section line removed;

Fig. 8 is a bottom plan view of the piston of the pulsator;

Fig. 9 is a plan view of the teat cup connecting tubes for connecting the teat cups in a group, some parts being sectioned; and Fig. 10 is a section on the line 10—10 of Fig. 9.

The numeral 11 indicates a milk can and the numeral 12 indicates a cover therefor, the latter having an annular groove fitted with a pliable gasket 13 adapted to form an air-tight joint with the rim of the can.

The numeral 14 indicates a horizontally disposed cylinder and the numeral 15 a piston that is arranged to reciprocate and oscillate therein. The cylinder 14 at the bottom is formed with a base flange rigidly secured by a screw 16, or the like, to the cover 12 so that the said cover affords a base for the pulsating device. The piston 15 is provided with an intermediate air conduit 17 that terminates in circumferentially spaced ports $17^a$ and $17^b$; and near to its ends said piston is formed with radial air conduits 18 and 19 that terminate respectively in circumferentially spaced air ports $18^a$ and $19^a$. The inner extremities of the conduits 18 lead to an axial air conduit 20, and the inner extremities of the air conduits 19 lead to an axial air conduit 21. These conduits 20 and 21 open through the opposite ends of the piston structure including, as shown, the piston packing 22. By reference to Fig. 8 it will be noted that the ports $18^a$ and $19^a$, as well as the ports $17^a$ and $17^b$ have considerable longitudinal extension, and it will be further noted that the ports $18^a$ have very considerably less circumferential distance between them than do the corresponding opposite end ports $19^a$. This is done for an important purpose which will presently appear.

The cylinder 14 has air-tight heads and it is formed with three centrally located ports 23, 24 and 25, all of which coöperate with the intermediate or centrally located ports 17ª and 17ᵇ of the piston. At one side of the said three ports, the cylinder is provided with circumferentially spaced ports 26 and 27, and at the other side of said ports said cylinder is formed with similar ports 28 and 29. The ports 26 and 27 coöperate with the piston ports 18ª and the ports 28 and 29 coöperate with the piston ports 19ª, as will hereinafter more clearly appear.

By referring to Figs. 4, 5, and 6 it will be noted that the ports 23, 26, and 28 are connected by a long air channel 30 formed in a head 31 rigidly secured to an upright air tube 32, the lower end of which tube is rigidly anchored to the cover 12 by a base coupling 33 and a coöperating threaded clamping plug 34, best shown in Figs. 3 and 4. The interior of air tube 32 is connected to the air channel 30 by an air channel 36. (See Figs. 4 and 6). The main air tube 32 will be connected by an ordinary rubber hose, or the like, to a vacuum tank or other means for maintaining therein and in the milk can the desired partial vacuum.

The coupling plug 34 is formed with a narrow seat, the passage through which is normally closed by a gravity seated check valve 37 (see Fig. 3) that opens to permit air to be withdrawn from the can, but checks the flow of air in a reverse direction, or into the can. Also the plug 34 for an important purpose is made hollow and internally threaded, and the enlarged base end of a relatively small inner tube 38 is screwed into the same. This inner tube 38 rises quite high within the main air tube 32 for the following reason: Some lubricating oil must be used in the cylinder and this under the partial vacuum produced in the system will sooner or later run into the air tube 32, and without special provision for trapping the same, such oil would run into the milk can and would be commingled with the milk. With the arrangement described, however, it can accumulate within the tube 32 and cannot reach the can as long as it does not overflow the inner tube 38 which, of course, is practically impossible. When the milking apparatus is being cleaned and the cover is removed from the can, the plug 24 can be unscrewed and the oil removed and the apparatus readily sterilized.

By referring to Fig. 4, it will be noted that central port 24 is connected with the atmosphere; by reference to Figs. 4 and 6 it will be noted that intermediate port 25 is connected to two nipples 39.

Ports 27 and 29 in like manner are connected to atmospheric air conduits 40 (see Figs. 5 and 6), and these atmospheric air conduits are arranged to be restricted, that is opened and closed to any desired extent, the one independent of the other, by means of threaded choke valves 41. Also by referring to Figs. 5 and 7 it will be noted that the ports 26 and 28 are arranged to be restricted, that is opened and closed to any desired extent by threaded choke valves 42. The choke valves 41, as shown, have threaded engagement with the base portion of the cylinder 14, while the choke valves 42 have threaded engagement with the head 31. The said four valves, 41—41 and 42—42 are capable of adjustments each independent of the other. The mechanism of the above character is especially designed for use in connection with double chamber teat cups of the general character disclosed and claimed in my prior Patent, 1,201,808, of date, October 17, 1916.

In such an arrangement, the ordinary rubber tubes 43 (the apparatus illustrated being designed for milking two cows) will connect the respective air nipples 39 each to a metallic coupling tube 44. (See Fig. 9). This tube 44 has four nipples 45 that are connected by flexible tubes, not shown, to the outer or air chambers of the respective teat cups, not shown. The numeral 46 indicates a second metallic coupling tube that is provided with four nipples 47 which by flexible tubes, not shown, will be connected to the milk chambers of the respective teat cups. The coupling tubes 46 of the two teat cup groups are connected by rubber milk tubes 48 to nipples 49 of tubular valve casings 50 that are rigidly secured to and open into the can cover 12, and are provided with stop cocks 51 for opening and closing communications between the said nipples 49 and the interior of the milk can.

The two coupling tubes 44 and 46 of the teat cup coupling device are detachably connected so that they may be readily separated for cleaning purposes; and this is shown as accomplished by providing said tubes with lapping laterally projecting arms 52 connected by screws 53. The ends of the arms 52 are notched to fit the adjacent tubes and to assist in preventing pivotal movement on the screws 53.

At its central portion the piston 15 is provided with an upwardly projecting cam pin 54 (see Figs. 1 and 2) that works through a large opening 55 in the top of the cylinder. This cam pin engages with and is adapted to be worked completely around an oval cam block 56 shown as secured to the underside of a bridge bar 57 secured on studs 58 that project from the top of the cylinder. Reversely arranged and yieldingly held shifting arms 59 are pivoted on the studs 58 and are connected by a spring 60 that normally holds the same against stop pins 61 projecting below the end portions of the cam block 56.

The numeral 62 indicates a handle shown as secured to the upper ends of standards 63 rigidly secured at their lower ends to the cover 12 and, as shown, provided at their upper ends with hook-like extensions 64 adapted to hold the teat cup tubes.

*Operation.*

The operation of this improved pulsator is substantially as follows:

When the apparatus is in operation, there will be an approximately constant suction in the milk can and, hence, also within the teat receiving chambers of the several teat cups so that there is a constant tendency to draw milk from the teat cups into the can.

The pulsations which are produced cause the flexible linings or teat engaging walls of the teat cups to compress the teats and then expand, and release the squeezing pressure on the teats. Obviously, the constant pressure within the flexible walls of the teat cups will contract the same against the teats when the suction or partial vacuum is relieved in the air tubes 43 and, hence, in the outer chambers of the teat cups. These alternating pulsations produce a very natural milking operation. We will now follow the operations of the apparatus in producing the above pulsations.

In the first place, it will be noted that the endwise movements of the piston 15 within the cylinder 14 are sufficient to carry the central ports 17ª and 17ᵇ slightly from one side to the other of the coöperating centrally located cylinder ports 23, 24 and 25, while the elongated ports 18ª and 19ª, being approximately as long, or a little longer, than the endwise movement of the piston never move endwise to positions in which the said ports cannot operate, providing the piston is in a proper rotary position.

Assume as a starting point that the piston is at the right hand end of the cylinder, ready to commence its movement toward the left, in which case its cam pin 54 will be in the position shown by full lines in Fig. 5. In this position of the piston, one of the right hand ports 18ª is rotated out of registration with suction port 26 (see Fig. 7), but the other of said ports 18ª is in registration with atmospheric port 27, so that atmospheric pressure is effective in the right hand end of the cylinder, the condition of partial vacuum existing in the opposite end of the cylinder will then cause the piston to move from the right toward the left. Here it will be noted that port 17ᵇ has a circumferential extent, such that it will, in a certain position, connect the cylinder ports 24 and 25. During the greater part of the movement of the piston from the right toward the left, ports 17ª and 17ᵇ and conduit 17 will connect the air port 25 to vacuum port 23, so that partial vaccum will, during that time, be effective in the outer chambers of the teat cups, causing the expansible annular walls of the teat cups to expand. As the piston closely approaches its extreme position toward the left, its cam pin 54 engages the left hand shifting arm 59, and the latter, operating on said pin, quickly oscillates the piston into the position indicated by dotted lines in Figs. 4, 5 and 7. In this latter noted position of the piston, one of the ports 19ª in the left hand end of the piston is moved out of registration with left hand cylinder vacuum port 29 and the other port 19ª is moved into registration with the atmospheric port 29, so that atmospheric pressure will then be effective in the left hand end of the cylinder. At the same time, or in the said latter noted position of the piston (see Fig. 7), one of the ports 18ª will be moved into registration with vacuum port 26 in right hand end of the cylinder, while the other port 18ª will be moved out of registration with atmospheric port 27, so that partial vacuum will be effected in the right hand end of the cylinder, and this, as is evident, will cause the piston to move from the left toward the right until at the approach of its extreme movement in that direction, cam pin 54 is engaged with right hand shifting arm 59 and the said piston is then oscillated again back to its full line position (Figs. 5 and 7). Under movement of the piston from left toward the right, as just stated, and throughout the greater part of that movement, port 17ª will be out of registration with vacuum port 23 and port 17ᵇ will connect air port 25 to atmospheric port 24, thereby connecting the outer chamber of the teat cups to the atmosphere and permitting the flexible walls of the teat cups to be contracted by the partial vacuum that is constantly maintained in the inner chambers of the teat cups, or on the inner surfaces of the expansible annular walls thereof. This, as is evident, produces a pressure and immediate relief on the teats closely approximating the hand milking action.

Obviously, by independent adjustments of the four choke or restricting valves 41—41, 42—42, the speed timing of the movements of the piston in both directions may be varied at will. For example, the piston may be made to reciprocate a greater or less number of times per minute, and moreover, regardless of the number of complete reciprocations per minute, the time of each stroke may be varied and definitely proportioned. In this way, the apparatus can be set to produce a very hard or strong milking action, or a relatively mild or weaker milking action, to thereby adapt the apparatus to cows that have tender udders and teats, or to those that can stand a stronger milking action. This capability of adjustment to meet the above conditions is highly important.

What I claim is:

1. A pulsator comprising a cylinder and piston having coöperating ports, a suction pipe connected to certain of the cylinder ports, certain of the cylinder ports being open to the atmosphere and certain other cylinder ports being arranged for connection to a teat cup, means for oscillating said piston at the limit of its reciprocating movements, the said ports and oscillations of said piston coöperating to control reciprocations of said piston, and choke valves for variably opening said ports that open to the atmosphere.

2. A pulsator comprising a cylinder and a piston having coöperating ports, a suction tube connected to certain of the cylinder ports, certain of the cylinder ports being open to the atmosphere and certain of the cylinder ports being arranged for connection to teat cups, means for oscillating said piston at the limit of its reciprocating movements to cause said ports to coöperate to produce reciprocation of said piston, and choke valves arranged to independently and variably open the said atmospheric ports and the ports connected to said suction tube, whereby the reverse movements of said piston may be variably timed.

3. A pulsator comprising a cylinder and piston having coöperating ports, a suction pipe connected to certain of the cylinder ports, certain of the cylinder ports being open to the atmosphere and certain of the cylinder ports being arranged for connection to a teat cup, means for oscillating said piston at the limit of its reciprocating movements to cause said ports to coöperate to produce reciprocation of said piston, a can cover affording a base upon which said cylinder and such tube are mounted, and the latter having a port that opens through said cover, and choke valves arranged to variably and independently open said atmospheric ports and the cylinder ports connnected to said suction tube.

4. In a pulsating device, the combination with a can cover affording a base, and a cylinder and suction pipe supported on said base, said suction tube being in constant communication with a port that opens through said base, said cylinder having three circumferentially spaced intermediate ports and a pair of end ports on each side thereof, one of the intermediate ports of said cylinder being in communication with teat cup connections, another thereof being open to the atmosphere, and the other thereof being connected to the said suction pipe, one of each pair of end ports of said cylinder being open to the atmosphere, and the other end ports being connected to said suction pipe, the said base having milk supply conduits adapted for connection to teat cups, a piston working within said cylinder and provided with a branched intermediate port and with end ports, the end ports of said piston being longitudinally extended so that they are not moved out of longitudinal line with the end ports of said cylinder and being arranged to alternately connect the opposite ends of said cylinder to the atmosphere and to said suction tube, whereby said piston is automatically reciprocated, means for oscillating said piston at the limit of reciprocatory movements thereof, and choke valves arranged to independently and variably open said atmospheric ports and the cylinder ports connected to said suction tube.

5. In a milking apparatus, the combination with a can cover and a pulsating mechanism applied thereon, of a vacuum tube connected to said pulsating mechanism, and having a base end portion extending to said cover, a coupling plug extended through said cover and into the base of said vacuum tube to anchor the same in place, an upwardly open check valve in said plug, and an inner tube having tight threaded engagement with said plug at its lower end and rising therefrom within said vacuum tube.

6. A coupling device for a group of teat cups comprising two metal tubes, each having a plurality of nipples, said tubes having overlapped arms, and means detachably connecting said arms.

7. A coupling device for a group of teat cups comprising two metal tubes, each having a plurality of nipples, said tubes having overlapped arms, and screws detachably connecting said arms, the ends of said arms being notched to fit adjacent tubes.

In testimony whereof I affix my signature in presence of two witnesses.

LAURITS DINESEN.

Witnesses:
CLARA DEMAREST,
BERNICE G. BAUMANN.